United States Patent
Taubenberger et al.

(10) Patent No.: US 6,890,000 B2
(45) Date of Patent: May 10, 2005

(54) INFLATABLE HEAD PROTECTION SYSTEM FOR OCCUPANTS OF MOTOR VEHICLES

(75) Inventors: Josef Taubenberger, Bruckmuehl (DE); Jens Schaper, Munich (DE); Markus Meister, Munich (DE); Hans-Peter Sertl, Kemnath (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 540 days.

(21) Appl. No.: 09/864,165

(22) Filed: May 25, 2001

(65) Prior Publication Data

US 2001/0045732 A1 Nov. 29, 2001

(30) Foreign Application Priority Data

May 25, 2000 (DE) .......................................... 100 26 024

(51) Int. Cl.[7] .............................................. B60R 21/18
(52) U.S. Cl. .................. 280/733; 280/730.2; 280/743.2
(58) Field of Search ............................. 280/730.2, 733, 280/743.2

(56) References Cited

U.S. PATENT DOCUMENTS

| | | | | |
|---|---|---|---|---|
| 3,953,049 A | * | 4/1976 | Surace et al. ............ 280/730.1 |
| 5,496,061 A | * | 3/1996 | Brown ..................... 280/730.2 |
| 6,059,311 A | * | 5/2000 | Wipasuramonton et al. ..... 280/729 |
| 6,155,598 A | * | 12/2000 | Kutchey .................. 280/730.2 |
| 6,336,656 B1 | * | 1/2002 | Romeo ........................ 280/733 |
| 6,406,059 B1 | * | 6/2002 | Taubenberger et al. ..... 280/733 |

FOREIGN PATENT DOCUMENTS

| | | | | | |
|---|---|---|---|---|---|
| DE | 4305291 | | * | 9/1993 | ................. 280/733 |
| DE | 4305505 A1 | | * | 9/1993 | ................. 280/733 |
| EP | 592815 | | * | 4/1994 | ................. 280/733 |

* cited by examiner

*Primary Examiner*—Paul N. Dickson
*Assistant Examiner*—Toan C To
(74) *Attorney, Agent, or Firm*—Crowell & Moring LLP

(57) ABSTRACT

An inflatable head protection system for occupants of a motor vehicle is provided which has an air bag which is inflated laterally of the head in the event of a side impact and prevents the displacement of the head. The head protection system has a belt guiding duct, the belt strap of a seat belt extending through this belt guiding duct. In order to be able to follow the belt strap movements, the head protection system is swivellably fastened by way of a ball joint on the upper edge of a seat backrest.

4 Claims, 1 Drawing Sheet

INFLATABLE HEAD PROTECTION SYSTEM FOR OCCUPANTS OF MOTOR VEHICLES

CROSS-REFERENCE TO RELATED APPLICATIONS

This application is related to co-pending U.S. patent application Ser. No. 09/864,168.

BACKGROUND AND SUMMARY OF THE INVENTION

This application claims the priority of German Application No. 100 26 024.1, filed May 25, 2000, the disclosure of which is expressly incorporated by reference herein.

The invention relates to an inflatable head protection system for occupants of motor vehicles.

A head protection system of this type is known from European Patent Document EP 0 592 815 B1. An air bag is arranged in the upper section of a seat belt designed as a diagonal belt and is fastened by one end to the B-column of the vehicle body. The gas generator for filling the air bag is also situated in this area. Because of this arrangement, the known construction is not suitable for open vehicles, such as convertibles.

It is an object of the invention to provide a head protection system of the above-mentioned type also for open vehicles.

According to the invention, the object is achieved by providing an inflatable head protection system for occupants of motor vehicles having an air bag which, in the inflated condition, extends laterally over the shoulder between the vehicle occupant's head and the adjacent vehicle body parts. A seat belt, which extends over the vehicle occupant's chest area and to which the head protection system is assigned in the area of the upper edge of a seat backrest of a vehicle seat is also provided. The belt strap of the seat belt extends through a belt guiding duct of the head protection system. The head protection system can be swivelled in its height by way of a joint and is fastened in the area of the upper edge of the seat backrest while being rotatable in itself. Further developments of the invention are described herein.

According to the invention, the head protection system is therefore arranged and held at the upper edge of the seat backrest. As a result, it is particularly suitable for open vehicles, such as convertibles. These vehicle types have no vehicle body sections in the form of B-columns or C-columns. Furthermore, the head protection system provides a belt guiding duct through which the belt strap extends. As a result and together with the hinged arrangement on the backrest, the head protection system follows all movements of the belt strap, such as belt fastening and unfastening operations, adaptation to the various sizes of the occupants, seat and backrest adjusting movements and occupant movements.

In a preferred embodiment of the invention, the gas generator for inflating the air bag is situated in the backrest of the vehicle seat. The feeding of gas expediently takes place through the joint by means of which the head protection system is swivellably mounted on the backrest. A particularly compact construction is obtained in that the gas feeding device between the joint and the air bag simultaneously carries the head protection system.

The head protection system according to the invention is particularly suitable for vehicle seats with an integrated belt system, in which all belt anchoring points are situated in or on the seat. A load-bearing belt guiding device on the seat backrest and in the vicinity of the head protection system excludes the forces resulting from the belt, so that they are not transmitted to the belt guiding duct and thus to the entire head protection system.

As mentioned above, the invention provides protection for the head even in open vehicles. However, it is not limited to such vehicles. On the contrary, it is generally suitable in the case of vehicles for the forward as well as for the rearward seats. It also permits the use of child seats. A solution is provided in this case at reasonable cost which has no influence on the belt geometry and in the case of which no loss of comfort is to be expected.

Other objects, advantages and novel features of the present invention will become apparent from the following detailed description of the invention when considered in conjunction with the accompanying drawings.

DETAILED DESCRIPTION OF THE DRAWINGS

Figure 1:
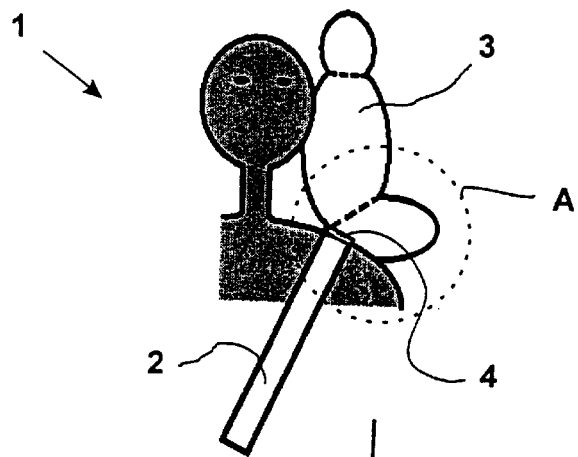
FIG. 1 is a schematic representation of a vehicle occupant's upper body with a lateral inflated air bag.
Figure 2:
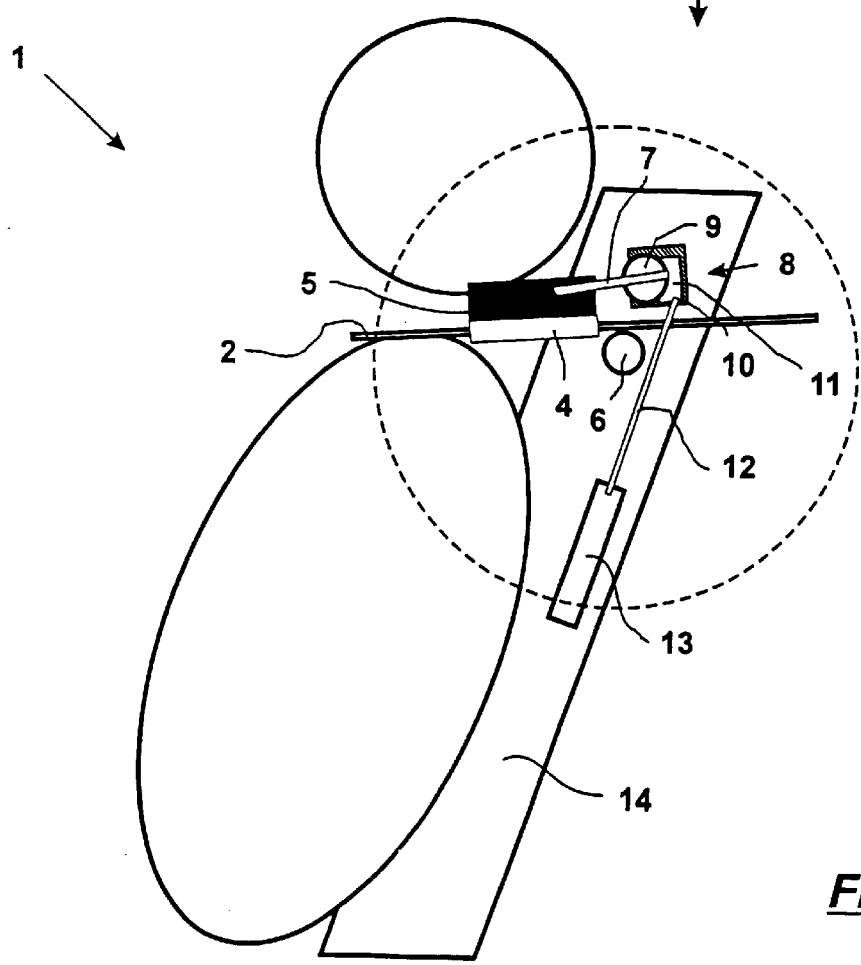
FIG. 2 is an enlarged schematic lateral view of a vehicle seat with a non-activated head protection system according to the invention.

The person schematically illustrated in FIG. 1 is the occupant 1 of a motor vehicle. The shoulder area and head area are visible, along with a belt strap 2, which extends over the chest area, of a three-point seat belt which is not shown in detail. An inflated air bag 3 rests on the occupant's shoulder and supports his head against lateral displacement and against adjacent vehicle body parts which may penetrate the occupant compartment in the event of a side crash. FIG. 2 shows the arrangement of the air bag. For this purpose, the section, which in FIG. 1 is indicated by means of the circle A, is rotated by 90 degrees in FIG. 2 and is shown in an enlarged scale.

The air bag 3 is part of a head protection system which, according to FIG. 2, in addition to the air bag 3, consists essentially of a belt strap guiding duct 4 and a covering 5 which envelopes the folded-together air bag. In this case, the head protection system is situated in the area of the upper edge of a seat backrest 14 which, on the one hand, is part of a vehicle seat, (not shown) and on which the occupant 1 sits down according to FIG. 1. The driver seat is preferably equipped with an integrated seat belt system, which is not shown but is mentioned to complete the picture. In the case of such a seat belt system, the belt strap extends from a lower anchoring point provided in the area of the seat cushion upward to a deflection and from there through the backrest back to a belt retractor. FIG. 2 indicates the deflection as the belt guiding device 6 which, in the case of a seat-integrated belt system, must be designed to be load-bearing. A buckle latch, through which the belt strap is looped, can be anchored in a belt buckle on the opposite side of the seat cushion.

Coming from the vehicle occupant's chest area, the belt strap 2 extends through the belt guiding duct 4 to the belt guiding device 6. There, it is normally deflected downward but, for reasons of clarity, it extends in a straight line toward the rear in the present representation. The belt guiding duct 4 with the air bag and its covering 5 are rigidly connected by way of a tubing 7 with a spherical joint part 9 of a ball joint which, as a whole, has the reference number 8. The spherical joint part 9 is rotatably disposed in a ball case 10 fixedly connected with the seat backrest 14. The tubing 7 penetrates the spherical joint part 9 and leads into a chamber 11 of the ball case 10 which opens up behind the spherical guiding surface. The other end of the tubing 7 is situated within the folded-together air bag.

In a construction which is not illustrated, the belt guiding duct 4 with its additional parts—air bag and its covering—is connected directly with the ball joint 8. In this case, the tubing 7 does not necessarily have a bearing function and can therefore also have a flexible design.

However, in each case, the head protection system is swivellable in its height as a result of the ball joint and, in addition, can be rotated in itself, so that it can easily adapt to vehicle occupants of different heights.

A second tubing 12, which is used as a feeding tube for a gas generator 13 provided in the seat backrest, leads into the chamber 11. The gas generator does not necessarily have to be housed there. Depending on the design of the vehicle or of the seat, it may be provided in the vehicle body or in the headrest. With respect to the swivelling range of the spherical joint part 9, the dimensions of the chamber 11 are selected such that, in any of its possible positions caused be the worn belt, the outlet opening of the tubing 7 will not be blocked.

When a side impact is detected by a sensor (not shown), the gas generator 13 will ignite. This causes the gas to flow into the chamber 11 by way of the tubing 12 and from there through the spherical joint part 9 by way of the tubing 7 into the air bag 3. The air bag will be inflated and assume its shape illustrated in FIG. 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A head protection system for an occupant of a motor vehicle, comprising:
   an inflatable air bag which, in an inflated condition, extends laterally over an occupant's shoulder between the occupant's head and adjacent vehicle body parts;
   a seat belt, which in use extends over the occupant's chest area;
   a belt guiding duct of the air bag, wherein a belt strap of the seat belt extends through the belt guiding duct; and
   a joint about which the air bag is swivelled so as to be vertically adjustable, said air bag being fastened to an upper edge area of the seat backrest via the joint while being rotatable in itself.

2. The head protection system according to claim 1, wherein said joint is a ball joint including a ball case fastened on the seat backrest and a spherical joint part rotatably held in the ball case and connected with the head protection system.

3. The head protection system according to claim 2, further comprising a gas generator arranged in the seat backrest, said gas generator inflating the air bag via the ball joint.

4. An inflatable head protection system for an occupant of a motor vehicle, comprising:
   an air bag system which, in an inflated condition, extends laterally over an occupant's shoulder between the occupant's head and adjacent vehicle body parts;
   a belt guiding duct formed on the air bag system; and
   a swivellable joint operably coupled with the air bag system to variably adjust the height of the air bag system in accordance with a size of the occupant,
   wherein said joint is a ball joint having a ball case fastenable on a seat backrest and a spherical joint part rotatably held in the ball case and coupled with the air bag system.

* * * * *